UNITED STATES PATENT OFFICE.

EDGAR SIDDONS WILSON, OF STROUD, AND EBENEZER STEWART, OF LONDON, ENGLAND.

DYE FROM COTTON-SEED OIL.

SPECIFICATION forming part of Letters Patent No. 640,061, dated December 26, 1899.

Application filed December 15, 1897. Serial No. 662,055. (No specimens.)

*To all whom it may concern:*

Be it known that we, EDGAR SIDDONS WILSON, residing at Stroud, and EBENEZER STEWART, residing at London, England, subjects of the Queen of Great Britain, have invented new and useful Improvements in the Separation and Purification of Coloring-Matter from Crude Cotton-Seed Oil, (for which we have obtained a patent in Great Britain, No. 24,418, bearing date December 20, 1895; in France, No. 261,457, bearing date November 20, 1896, and in Egypt, No. 56, bearing date May 23, 1897,) of which the following is a specification.

In refining crude cotton-seed oil by alkaline solutions—such, for example, as caustic soda or mono-carbonate of soda—with or without the addition of a soluble sulphite, a coloring-matter is removed from the oil which has not hitherto been found of much value, owing to its admixture with fatty matter and other impurities. We have found that by suitable treatment impurities can be removed from the coloring-matter and the latter rendered more suitable for use.

In carrying out our invention we take the alkaline liquor separated from the oil and containing the said coloring-matter and impurities and treat it by the process known to chemists as "fractional precipitation," using for this purpose certain earthy salts, such as the chlorides of magnesium or calcium, sulphate of magnesia, or any of the salts of metallic bases, which, with the fatty acids removed from the oil by the said alkaline liquor, produce insoluble or not easily soluble soaps. The fatty acids, resinous matter, and other impurities are by this means wholly or partly got rid of, and to the residual liquor, which contains the coloring-matter, is added hydrochloric or sulphuric acid or any acid which will combine with the alkali or decompose alkaline carbonate or soluble sulphite and precipitate the said coloring-matter. The coloring-matter precipitated as a flocculent precipitate is collected for use preferably in a pasty condition.

As an example of the application of our invention we give the following: Two thousand two hundred gallons of crude cotton-seed oil are agitated in a suitable tank with six hundred gallons of a solution of soda crystals containing from one-quarter to one-half a pound of crystals to the gallon. We have found that the coloring-matter undergoes deterioration during this process if the temperature is allowed to reach the boiling-point, (212° Fahrenheit,) and we therefore prefer to use a refining solution of the above or other convenient strength at a temperature of about 120° to 130° Fahrenheit. After the oil and alkaline liquor have been kept in agitation for the time necessary to remove the coloring-matter the contents of the tank are allowed to separate by subsidence or are made to separate by any known methods and the liquor, which is of a deep brown color, is drawn off. The brown liquor is then mixed with a solution of magnesium or calcium chloride, so that from one-half to one part, by weight, of the salt is added to one hundred parts, by weight, of the liquor. The mixture of liquor and salt solution is then raised to the boiling-point and kept boiling till the separation of the dark, insoluble, or not easily soluble mixture of soap and other impurities is complete. The hot liquor, which now contains the improved coloring-matter, is then allowed to remain at rest and is drawn off or, if necessary, filtered or separated by any known method from the impure soap. The purified coloring-matter is precipitated by dilute hydrochloric or sulphuric or any suitable acid, this precipitation being effected when the liquor is either hot or cold. The coloring-matter separates sharply from the acid liquor in the form of a flocculent precipitate, which when collected on filters and drained forms a paste suitable for use in dyeing, printing, and the like.

We do not limit our method by using only a solution of soda crystals, as set forth in the above example, as any other weak alkaline or alkaline carbonate solution may be used to extract the coloring-matter from the oil. Neither do we limit ourselves to the exact quantity of the magnesium chloride or other salt above specified, as this quantity may have to be varied according to the quality of the cotton-seed oil at different seasons of the year.

We claim—

1. The method of obtaining coloring-matter from cotton-seed oil, consisting in treating the oil with an alkaline solution, separating the solution from the oil, treating said solution to remove the impurities, and then precipitating the coloring-matter from the remaining liquor by an acid; substantially as described.

2. The method of obtaining coloring-matter from cotton-seed oil, consisting in heating the oil with an alkaline solution, separating the resulting liquor, subjecting this liquor to fractional precipitation, producing an insoluble soap from the fatty acids and other impurities, and precipitating the coloring-matter from the remaining solution by an acid; substantially as described.

EDGAR SIDDONS WILSON.
   EBENEZER STEWART.

Witnesses:
 HENRY CUTHBERT STRIDE,
 SYDNEY GEORGE ANTHONY.